May 20, 1941.   S. C. HOPE   2,242,749
GASOLINE HOSE AND HOSE HANDLING APPARATUS
Filed Oct. 23, 1940   2 Sheets-Sheet 1
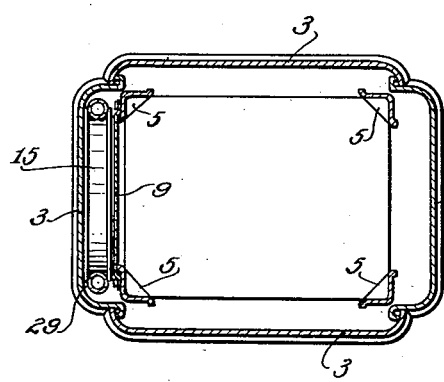
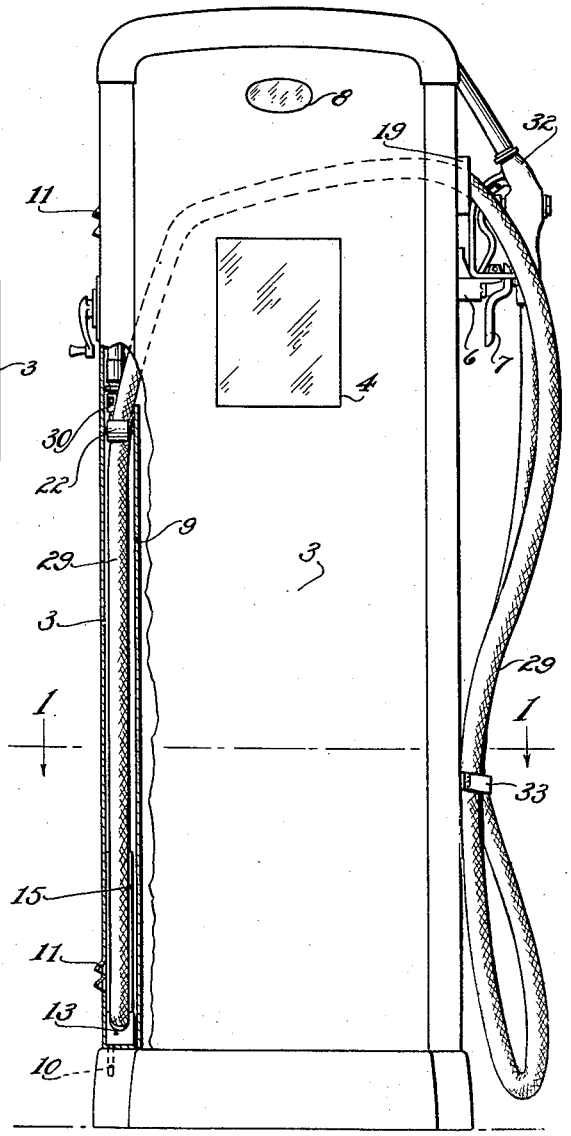
INVENTOR
STANLEY C. HOPE
BY Chapin & Neal
ATTORNEYS May 20, 1941.　　　　S. C. HOPE　　　　2,242,749
GASOLINE HOSE AND HOSE HANDLING APPARATUS
Filed Oct. 23, 1940　　　2 Sheets-Sheet 2
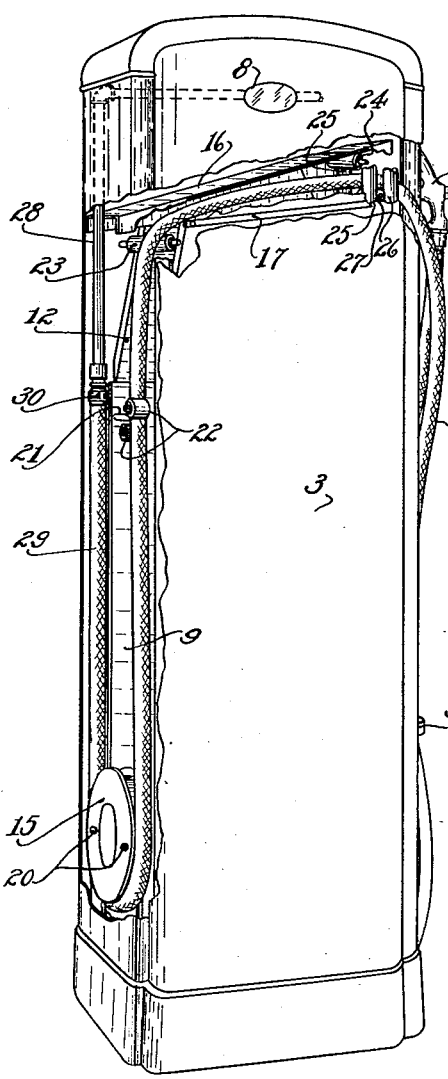
INVENTOR
STANLEY C. HOPE
BY Chapin & Neal
ATTORNEYS Patented May 20, 1941

2,242,749

UNITED STATES PATENT OFFICE 2,242,749

GASOLINE HOSE AND HOSE HANDLING APPARATUS

Stanley C. Hope, Guilford, Conn., assignor to Gilbert & Barker Manufacturing Company, West Springfield, Mass., a corporation of Massachusetts Application October 23, 1940, Serial No. 362,456

1 Claim. (Cl. 299—77)

This invention has been made to improve hose handling apparatus. It is for use mainly in gasoline pumps at service stations. Apparatus containing the invention will avoid expense or certain troubles, or both, which are found in prior art apparatus.

At the present time the gasoline pump in most general use is supplied with about ten feet of hose. The nozzle length is usually more than one and less than two feet long. It is all kept on display outside the pump casing. The end of the supply pipe extends outside the casing where it is joined to the inner end of the hose near the top. When not being used this hose is hung up in one loop with the nozzle at the top. When used, all of it is moved around as the operator works. Customers know its range of about ten feet. For the most part they stop their cars within their correct estimate of that ordinary service range. There are advantages in this prior practice. But there are also disadvantages. These are due to occasional errors in the customers' performance when they carelessly overestimate the displayed hose range and stop cars just a little bit out of range. This has led to attempts to conceive and market better hose handling apparatus at filling stations. Different conceptions have been tried out, but so far as I know them, each has some objections which under my invention are avoided.

According to the main plan of my invention I retain all the advantages of the above first mentioned old prior hose handling means in most general use, combine with it means to avoid the errors of its old practice, adapt the combination for an easy mode of operation and easy application of the improved hose handling apparatus to new dispensing "pumps" when being made in the factory or to old "pumps" in the field.

I will disclose in the accompanying drawings and following description the best combination now known to me for practicing the invention.

In the drawings—

Fig. 1 is a section on line 1—1 of Fig. 2;

Fig. 2 is a side view of the service station pump showing the gasoline hose mounted and ready for the hose handling operations; a small portion of the casing is cut away to indicate part of the hose inside;

Fig. 3 is a perspective view of Fig. 2 from the left and in this view more of the casing is cut away to show the hose arrangement inside;

Fig. 4 is a detail perspective view of parts indicated at the upper left-hand part of Fig. 3; and Fig. 5 is a detail perspective view of part of the hose handling apparatus adjacent the opening where the hose extends out of the casing.

Referring to Figs. 1 and 2, the display casing 3 for a conventional gasoline service station pump is shown. Such a casing is designed primarily for the electrically operated pump, the gasoline meter, the indicator with window 4, and many other elements of apparatus. The customary parts enclosed by such a casing which make up its crowded contents are well known and not shown here. I will refer mainly to my hose and hose handling apparatus which are combined for use with the same kind of casing.

The casing commonly has an internal frame made of four corner posts 5. It is common to arrange the outside casing walls 3 with posts 5, as indicated in Fig. 1. There is ordinarily a hose nozzle support 6 provided outside the casing, as shown in Fig. 2. The switch lever 7 to turn the pump on and off is indicated adjacent support 6, as is common. At the high point of the liquid supply means inside the casing, it is common to provide a little window 8 through which liquid flow may be seen from the outside. It is on this kind of "pump" apparatus or casing, as indicated, that I build my hose and hose handling apparatus. It is with this kind of pump apparatus or its equivalent that my new parts make their new and useful combination.

Within and at one side of the casing I provide a partition wall 9, as in Fig. 1. It makes, with adjacent casing wall 3, an interior hose well. It is just a little more in one direction, crosswise than the hose diameter and substantially the width of the casing in the other crosswise direction. It extends substantially to the bottom of the casing where it is drained through opening 10, Fig. 2, and vented by casing louvers 11. It extends vertically to about two-thirds the casing height, where it joins a slanting trough 12, Figs. 3 and 4. At the bottom of this well I provide a bumper stop, by fastening at the bottom a small rubber block 13 (Fig. 2), and near the top a spring mounted bumper stop 14 (Fig. 4), supported in a bracket from an adjacent wall. These stops conveniently limit the vertical movement of weighted sheave 15 in the hose well.

The slanting trough 12, Fig. 3, connects the hose well with a transverse hose conduit made by hood part 16 and floor part 17. The idea is to have the hose well on one side of the casing connected to the hose exit opening on the other side by safety means. Should the hose leak, this means will confine the leaking liquid to the conduit and well. In the well the gasoline can be drained and vapors vented. Thus, the liquid from any hose leak will be trapped and confined to the hose path in the casing. Both above and below the hose path through the hood the casing contains electrical apparatus, such as lights and motor.

At the hose exit end of hood 16, a roller supporting frame 18 and 19, Fig. 5, is mounted. These parts, as well as parts 16, 17, and 12, Fig. 3, are supported by suitable attachments or brackets fastened to the corner posts 5. Such attachments are not shown in detail, as they would confuse the drawing. The trough 12, crosswise hose conduit, and roller frame 18 and 19 are mounted to occupy the positions shown. Frame part 19 in Fig. 5 is shown protruding just a bit in Fig. 2. It is through this part that the hose exit opening extends. Portions are cut away in Fig. 3, which are shown clearly in Fig. 5, while the outside "pump" casing appearance is shown in Fig. 2.

I will now describe the hose sheave and antifriction roller means for the hose path inside the casing. The sheave 15 is made to take one wide bottom 180° turn of the hose. This turn preferably has as wide a diameter as the hose well will permit, see Fig. 1. The sheave preferably has sufficient weight in its construction to normally stay in the bottom of the well and retain the bight of the inside hose loop against bumper stop 13, except when the hose is deliberately pulled and held out. On the opposite sides of sheave 15 anti-friction balls 20 protrude slightly from suitable ball cages. Thus, the sheave is loose in the hose well and, except for its weight, is free to move upwardly. Its weight is proportioned as will be explained to move it and its hose loop downwardly. In these movements it rolls in the bight of the hose and its side faces through balls 20 make anti-friction contact with the walls of the well. The sheave movement is an easy one. At one side, near the top of the well, is a roller 21 and two rollers 22. The latter are spaced as shown with axes at right angles to the axis of roller 21. These rollers, as well as others to be described, are mounted in bearings held directly or in suitable brackets on corner posts 5 or on parts held by such posts. This is indicated in Fig. 4, by roller 23 near the top of trough 12.

The rollers at the front of the transverse hose conduit are as follows: Roller 24 in part 18, Fig. 5, is mounted to hold the hose from rising above its path. Two rollers 25 in part 19 are spaced to hold the hose sidewise as it moves over roller 27 to rollers 26 at the hose exit opening, see Figs. 3 and 5. All these rollers and their positions are most carefully arranged to give the hose an easy movement.

The path of the hose will now be described. As shown, the liquid supply pipe 28 extends to the top of the casing on the inside so that liquid flow through it may be indicated at window 8, Fig. 3. The hose 29 might be connected to pipe 28 at the top of the casing, but gasoline hose is more expensive than pipe so it is connected at pipe and hose union or fitting 30 at about the lower level of trough 12. This level is arranged in relation to the small amount of hose which I plan to pull out of the casing. The hose clamp 31 seen in Fig. 4 is to take the strain of pulling on the hose so it will not all be put on the union 30. It is a precaution against wear at the end of the hose. The arrangement is such that the hose extends down from the top of the casing or from near the top where it is connected to the supply means vertically above the hose well. It extends normally to the bottom of the well, makes one wide 180° turn about sheave 15, and extends upwardly and then to contact rollers 21 and 22. The latter are positioned to guide the hose properly to roller 21. It bends over the left-hand roller 22, Fig. 4, to start its diagonal path across trough 12 and over roller 21 to start its long upwardly slanting arc or bend to cross the inside of the casing through the hose conduit. The hose bends over roller 23 at about the center line of the hose conduit and passes slightly above the floor 17 to roller 27 and out between rollers 26. From its exit opening the hose normally hangs in the long single outside loop seen in Figs. 2 and 3, ending at nozzle 32 on its support 6. In Fig. 2 hairpin arm or fork 33, like an open spring clamp, is indicated to releasably retain the bottom of the long outside loop close to the casing if desired for better appearance.

This long hose loop hung on the outside of the pump casing and substantially the length of the casing is deliberately provided to give the old customary appearance and the customary function to that much of the hose as is displayed. When this is done I find that all the advantages of the old custom and practice are retained. This benefits the customer and pump attendant. The hose length normally outside is about ten feet long and the nozzle about nineteen inches long. The ordinary customer runs his automobile up to the "pump" within the "ten-foot" range, and the ordinary transactions of service and sale take place as they have for a long time in the art.

In that practice when occasionally the customer stops his car just short of the displayed hose range the pump attendant, by my arrangement, has enough, and no more extra hose to provide for the margin of error in the old practice. I have found from actual test in practice that a good allowance for this margin of error is between three and four feet. This small amount of extra hose, which is all that need actually be pulled out from and returned to the casing, is kept hidden, except for an emergency. When used it is used unobtrusively. The customer is not necessarily aware of the extra use. The attendant carries the "ten feet" of displayed hose toward the empty tank. When it is not quite long enough he pulls on it against very little resistance to get it long enough. The weight of the sheave is the principal part of the resistance. And this part is small. Because only a small length of hose need be pulled out by hand and later retracted automatically, a sheave of only enough weight to return that length is needed. In actual construction and use I have carried out my plan with a gasoline hose about nineteen feet long, a nozzle about nineteen inches long, a normal outside hose length about ten feet long. The amount of hose normally inside the casing available for actual extension outside is about three and a half feet. The rest of the inside hose length is desirable for the construction I have shown to make the operation very easy and to safeguard against any leak of the hose inside the casing.

Altogether the combination is peculiarly well adapted to avoid hose wear and guard against hose leaks inside the casing. Safety provisions are made inside the casing by its cross hose conduit connected to the hose well to take care of a leak if it does occur. It can be further guarded against by connecting the end of the hose originally fastened to the nozzle to the inside fitting 30 and vice versa. Thus, the hose originally kept inside the casing is now kept outside. The hose can be made to last a long while in this way, while unobserved leaks are guarded against.

Where, as in the disclosed structure, only a very few feet of hose ever needs to be pulled out, and that very infrequently, the hose handling apparatus can be made with an exceedingly small liability of trouble in use. I have not only substantially minimized the liability of trouble, but provided safety devices of efficient character should there be hose leaks inside the casing. The latter, as I have said, is primarily designed and used to contain the crowded parts of an electrically operated gasoline pump. I have not in my new hose handling apparatus made it necessary to enlarge the old casing, yet my hose handling arrangement, from the safety standpoint, is as if the hose when inside the "pump" casing had a separate casing all its own.

The advantages of the new combination are in convenience and economy of original manufacture, actual use for an improved condition at service stations, and safety provisions against leaking gasoline. The advantages of the old practice are retained, new ones combined with them without interference, and all with economy and safeguards in the use of gasoline hose and hose handling apparatus.

I claim:

Gasoline hose and hose handling apparatus for the purpose described comprising in combination, a display casing, a liquid supply means therein, a long hose connected at one end to said means, the hose extending from such connection downwardly and upwardly into a single loop wholly inside the casing, a weighted sheave tending to maintain such loop to contain a predetermined portion of the hose length in this one loop inside the casing, partition walls inside the casing and adjacent one side thereof and parallel to said side forming an internior well in which said loop is maintained, the well being small compared to the casing, upper and lower stops in said well to give predetermined limits to the pulling out and retracting movements of said loop, said hose extending from the top of said well upwardly and across interiorly of the casing to and through an upper hose opening in the casing wall remote from the well, an underlying trough for said hose traverse from the top of the well and an overlying hood therefor, anti-friction means to guide the hose in the casing to and through said opening, the hose being long enough when said weight is at the bottom of the well to extend into an outside loop substantially the height of the casing and long enough to serve all normal hose dispensing operations the range of which is displayed by the length of said outside loop, the said inside loop normally being kept its full length and hidden in said well but available by pulling against the weighted sheave to extend the normal outside hose length enough from the inside loop to compensate for a margin of error of a few feet in the normal extreme range of the outside hose portion, said stops to movement of the inside loop and its short length for extension and retraction restricting the amount of necessary retracting force of the weighted sheave to make the work of extension as easy as possible.

STANLEY C. HOPE.